United States Patent [19]

Brown et al.

[11] 4,342,796

[45] Aug. 3, 1982

[54] METHOD FOR INHIBITING CORROSION OF INTERNAL STRUCTURAL MEMBERS OF REINFORCED CONCRETE

[75] Inventors: Roy N. Brown, Edmond; Mike F. Stout, Yukon, both of Okla.

[73] Assignee: Advanced Chemical Technologies, Inc., Oklahoma City, Okla.

[21] Appl. No.: 185,993

[22] Filed: Sep. 10, 1980

[51] Int. Cl.$^3$ .......................... B05C 1/16; B05D 5/10
[52] U.S. Cl. ............................... 427/136; 427/314; 427/341; 427/387
[58] Field of Search .............. 427/136, 314, 331, 336, 427/340, 341, 353, 374.5, 384, 385.5, 387, 393.6; 428/446, 447

[56] References Cited

U.S. PATENT DOCUMENTS

| | | | |
|---|---|---|---|
| 2,015,875 | 10/1935 | Sloan | 141/1 |
| 2,306,222 | 12/1942 | Patnode | 117/106 |
| 2,507,200 | 5/1950 | Elliott et al. | 117/121 |
| 2,582,215 | 1/1952 | Hyde | 117/72 |
| 2,660,736 | 12/1953 | Biefeld | 9/17 |
| 2,683,674 | 7/1954 | Hatcher et al. | 427/387 |
| 2,758,946 | 3/1956 | Spalding et al. | 117/135.5 |
| 2,768,101 | 5/1956 | Fairchild | 134/34 |
| 2,774,690 | 12/1956 | Cockett et al. | 117/135.5 |
| 2,832,794 | 4/1958 | Gordon | 260/448.2 |
| 2,877,201 | 3/1959 | Bonza et al. | 260/33.6 |
| 2,893,898 | 7/1959 | Evans et al. | 117/161 |
| 2,962,390 | 11/1960 | Fain et al. | 117/64 |
| 3,026,213 | 3/1962 | Oppegard et al. | 106/285 |
| 3,048,499 | 8/1962 | Jellinek | 117/123 |
| 3,065,103 | 11/1962 | Marzocchi | 117/54 |
| 3,067,051 | 12/1962 | Oppegard et al. | 106/285 |
| 3,227,579 | 1/1966 | Bluestein | 117/161 |
| 3,244,541 | 5/1966 | Fain et al. | 106/13 |
| 3,258,382 | 6/1966 | Vincent | 427/340 |
| 3,303,048 | 2/1967 | Cooper et al. | 117/135.5 |
| 3,310,417 | 3/1967 | Lerner et al. | 106/387 |
| 3,328,490 | 6/1967 | Buning et al. | 260/899 |
| 3,372,052 | 3/1968 | Poiniaszek | 117/72 |
| 3,398,017 | 8/1968 | Baurain et al. | 117/123 |
| 3,423,236 | 1/1969 | Quaal | 117/161 |
| 3,520,832 | 7/1970 | Vogt et al. | 260/2 |
| 3,589,917 | 6/1971 | Hedlund | 106/12 |
| 3,646,085 | 2/1972 | Bartlett | 260/448.8 |
| 3,666,538 | 5/1972 | Domba | 117/121 |
| 3,689,300 | 9/1972 | Dunger et al. | 106/237 |
| 3,706,777 | 12/1972 | Seiler et al. | 260/448.2 E |
| 3,720,538 | 3/1973 | Bergmeister et al. | 117/72 |
| 3,772,065 | 11/1973 | Seiler | 117/123 |
| 3,772,346 | 11/1973 | Hess | 260/448.8 R |
| 3,778,280 | 12/1973 | Dittrich et al. | 106/1 |
| 3,814,619 | 6/1974 | Kobayasi et al. | 117/62 |
| 3,816,152 | 6/1974 | Yates | 106/287 SE |
| 3,819,400 | 6/1974 | Plankl et al. | 427/387 |
| 3,826,680 | 7/1974 | Rio et al. | 427/393.5 |
| 3,861,939 | 1/1975 | Merrill et al. | 117/132 BS |
| 3,879,206 | 4/1975 | Nestler et al. | 106/12 |
| 3,933,729 | 1/1976 | Letoffe | 260/37 SB |
| 3,950,588 | 4/1976 | McDougal | 428/288 |
| 3,975,248 | 8/1976 | Gorman | 204/157.1 S |
| 3,983,265 | 9/1976 | Letoffe | 427/58 |
| 4,002,800 | 1/1977 | Nestler et al. | 428/447 |
| 4,024,306 | 5/1977 | Takamizawa et al. | 427/387 |
| 4,073,972 | 2/1978 | Nestler et al. | 427/136 |
| 4,076,868 | 2/1978 | Roth et al. | 427/387 |
| 4,080,479 | 3/1978 | Vamvacas | 427/387 |
| 4,097,436 | 6/1978 | Buning et al. | 260/29.6 H |
| 4,109,032 | 8/1978 | Barrall | 427/255 |
| 4,118,540 | 10/1978 | Amort et al. | 428/447 |
| 4,125,673 | 11/1978 | Roth et al. | 428/447 |
| 4,133,938 | 1/1979 | Bingham | 428/447 |
| 4,137,367 | 1/1979 | Sample, Jr. et al. | 428/443 |
| 4,175,159 | 11/1979 | Raleigh | 428/405 |
| 4,186,227 | 1/1980 | Wulff et al. | 427/388 A |
| 4,219,591 | 8/1980 | Buning et al. | 427/387 |

FOREIGN PATENT DOCUMENTS

| | | |
|---|---|---|
| 942904 | 2/1974 | Canada . |
| 52-9073 | 1/1977 | Japan ................................ 427/387 |

OTHER PUBLICATIONS

Glass Technology, vol. 3, No. 4, Aug. 1962, p. 648.
Experimental Uses Described in Prior Art Statement.
FCP Annual Progress Report, for Year Ending 9-3-0-78, Published Apr. 1979 by Federal Highway Administration.
FCP Annual Progress Report, for Year Ending 9-3-0-79, Published 1981 by Federal Highway Administration.
Iowa Department of Transportation, Highway Division, Letter dated Aug. 1, 1980.
Oklahoma Department of Transportation, "Special Provisions for Penetrating Water Repellent Treatment of Concrete Surfaces", dated 1-3-80.
Oklahoma Department of Transportation, "Special Provisions for Chem-Trete Silane Treatment of Concrete Bridge Surfaces", dated 2-29-80.
Brochure "DYNASYLAN BSM 40", Dynamit Nobel Chemicals, undated.
Report No. CA-TL-79-13, Transportation Labatory, California Department of Transportation, dated Apr., 1979.
Portland Cement Association, "The Effects of a Surface Coating of Chem-Trete on some Physical Properties of Concrete", dated Nov., 1977.
Product Brochure "Chem-Trete$^R$ Silane", Magcobar--Dresser, undated.
"Spec Data" Magcobar Division, Dresser Industries, Inc., dated Feb., 1979.
"Chem-Trete Specifications", Magcobar Division, Dresser Industries, Inc., undated.

Primary Examiner—John D. Smith
Assistant Examiner—S. L. Childs
Attorney, Agent, or Firm—Dunlap & Codding

[57] ABSTRACT

An improved method for inhibiting corrosion of internal structural members of reinforced concrete, such as the corrosion of reinforcing steel members in a concrete bridge deck or a concrete paved driving surface, due to salt migration into the reinforced concrete. In general, the method comprises applying an effective amount of a hydrolyzable organo silicon compound to the surface of the reinforced concrete to substantially cover the surface of the structure with the organo silicon, and contacting the resulting organo silicon coated surface, after a period of time effective to allow the organo silicon compound to migrate into the structure, with an effective amount of water to substantially wet the surface of the organo silicon impregnated structure.

8 Claims, No Drawings

METHOD FOR INHIBITING CORROSION OF INTERNAL STRUCTURAL MEMBERS OF REINFORCED CONCRETE

BACKGROUND OF THE INVENTION

1. Field of the Invention

This invention relates to a method for inhibiting corrosion of internal structural members of reinforced concrete structures, and more particularly, but not by way of limitation, to a method for inhibiting corrosion of the structural reinforcing member of reinforced concrete due to salt migration into the concrete.

2. Description of the Prior Art

It is well known that water repellancy has been provided buildings constructed of masonry cement by treating the surfaces of such buildings to render them repellant to liquid water. Many different compositions and methods have been proposed, including impregnating the surface of materials containing free hydroxyl groups, i.e., cement and lime, with organo silicon compounds having a hydrophobic effect in order to make the surface of the material water repellant and thus more resistant to the action of the weather. Further, it has heretofore been known that the application of such organo silicon compounds to a structure formed of a material containing free hydroxyl groups reduces the adherence of frozen water, ice, to the surface of the structure and thus the ice can be more readily removed.

Even with the advance of technology relating to the water repellancy of masonry cement buildings, problems have nevertheless remained relating to the deterioration of reinforced concrete structures, such as bridge decks and concrete paved roadways, due to deterioration of such reinforced concrete structures because of corrosion of the reinforcing steel members of the structure as a result of salt migration into the structure, or de-icer scaling of the surface of the structure subjected to wear.

The reinforcing steel corrosion problem is of greatest magnitude on bridge decks which are subject to frequent applications of deicing salt. The spalling resulting from the corrosion of the reinforcing members in the concrete structure affects the riding surface, thus forcing continual maintenance and eventually destroying the structural integrity of the deck. A similar problem exists in coastal areas when the bottom of bridge decks, beams, piling, and piers are exposed to saltwater or salt spray.

In an effort to retard or eliminate the corrosion of reinforcing steel in structural concrete, the most prevalent cause of deterioration of structural concrete, several different procedures have been proposed, namely, (a) methods to keep chlorides out of the concrete or at least to keep the chlorides from reaching the reinforcing steel, (b) coating the reinforcing steel itself so as to protect the steel from the influence of the chlorides, (c) methods to apply cathodic protection, (d) development of a noncorrosive deicer, and (e) other methods to neutralize the effect of chlorides.

Although the corrosion of the reinforcing steel in concrete has been recognized as the most prevalent cause of deterioration of structural concrete, and several possible methods have been proposed as a means to prevent or substantially reduce the corrosion of the reinforcing steel, problems have still remained, especially when attempting to solve the problems with water-repellant sealer compositions. The problem of using water-repellant sealer composition is that "Although some sealers have been found to reduce freeze-thaw scaling of non-air entrained concrete, none has been found which will eliminate significant chloride penetration into bridge deck riding surfaces subject to abrasive traffic wear for long periods of time." (*FCP Annual Progress Report, Year Ending Sept.* 30, 1978 under the project entitled "Eliminate Premature Deterioration of Portland Cement Concrete").

SUMMARY OF THE INVENTION

An object of the present invention is to provide an improved method for preventing premature deterioration of reinforced concrete structures.

Another object of the present invention is to provide an improved method for inhibiting corrosion of steel reinforcing members of reinforced concrete structures.

Another object of the present invention is to prevent the deterioration of concrete paved roadways and bridge decks by inhibiting corrosion of internal steel reinforcing members in the concrete paved roadways and bridge decks.

These and other objects, advantages and features of the present invention will become apparent to those skilled in the art from the reading of the detailed description of the present invention in conjunction with the appended claims.

According to the present invention we have discovered an improved method for inhibiting corrosion of reinforcing members of reinforced concrete structures by retarding salt migration throught the concrete structures. Broadly, the method of the present invention comprises applying an effective amount of an organo silicon compound to at least one surface of the structure to substantially cover the surface of the structure, and applying to the organo silicon treated surface, after a period of time effective to allow the organo silicon compound to migrate into the concrete structure, an effective amount of water to substantially wet the surface of the structure. More specifically, the organo silicon compound is applied to a substantially dry surface of the concrete structure and the organo silicon is allowed to migrate into the concrete structure for at least about 30 minutes before wetting the surface of the structure with water.

DETAILED DESCRIPTION OF PREFERRED EMBODIMENTS

The present invention provides a new and novel method of inhibiting corrosion of structural reinforcing steel in reinforced concrete structures, such as the reinforcing in paved concrete roadways and bridge decks. Broadly, the invention resides in the discovery that one can substantially eliminate salt migration into a steel reinforced concrete structure, and thereby inhibit corrosion of the steel, by applying an organo silicon compound to a dry surface of the reinforced concrete structure, allowing the organo silicon compound to migrate into the concrete for an effective period of time, and thereafter applying water to the surface of the structure previously covered with the organo-silicon compound to substantially wet such surface.

The organo silicon compounds which can be employed in the method of the present invention can be any organo silicon compound capable of migrating into the concrete and which can be hydrolyzed within the concrete to form cross-linked polymers containing—Si- —O—Si—moieties which can react with the free hydroxyl groups present in the concrete. While any suitable organo silicon satisfying the beforementioned requirements can be used in the practice of the present invention, we believe that because of their commercial availability, silanes and siloxanes are most desirable.

The silanes, employed as the organo silicon compound in the method for inhibiting corrosion of the steel reinforcing members of structural concrete in accordance with the present invention can be represented by the general formula $$R-Si-(OR_1)_3 \qquad \text{Generic Structure I}$$

wherein:
R is a moiety selected from the group consisting of an alkyl containing from 1 to about 30 carbon atoms, an alkenyl, an aryl, a cycloalkyl, a cycloalkenyl, an aralkyl, or an aralkenyl; and
$R_1$ is a moiety selected from the group consisting of an alkyl containing from 1 to about 30 carbon atoms, a hydroxyalkyl, or an alkoxyalkyl.

The siloxanes employed as the organo silicon compound in the method for inhibiting corrosion of the steel reinforcing members of structural concrete in accordance with the present invention can be represented by the general formula

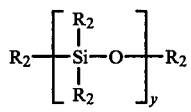

Generic Structure II wherein:
each $R_2$ is the same or different, and $R_2$ is a moiety selected from the group consisting of an alkyl containing from 1 to about 30 carbon atoms, an alkenyl, an aryl, a cycloalkyl, a cycloalkenyl, an aralkyl, or an aralkenyl; and
y is an integer of at least 2.

The alkyl moieties of the above-identified silanes and siloxanes can have a straight chain or branched chain configuration and, as previously indicated, can contain from 1 to about 30 carbon atoms. Exemplary of such alkyl moieties are methyl, ethyl, propyl, butyl, isopropyl, 2-ethylhexyl, n-octyl, n-dodecyl, n-tetradecyl, n-hexadecyl, n-octadecyl, n-eicosyl, n-tricosyl, decacosyl, 4-ethyl-3, 3-dimethylheptyl, 7-(1,2-dimethylpentyl)-5-ethyltridecyl, 6-(1-methylbutyl)-8-(2-methylbutyl) tridecyl, 2,3,5-trimethyl-4-propylheptyl, 6-(1-ethylpropyl)-7-(1-pentylhexyl) tetradecyl, and the like. However, because of their commercial availability the silanes and siloxanes containing alkyl moieties of from 1 to about 8 carbon atoms are preferred.

The alkenyl moieties of the silanes and siloxanes defined hereinbefore can also have a straight chain or branched chain configuration. The length of the alkenyl moieties can vary widely but will generally be from 1 to about 30 carbon atoms. Exemplary of such alkenyl moieties are vinyl, crotyl, propenyl, isopropenyl, 2-ethylhexenyl, butadienyl, n-nonenyl, n-tetradecenyl, n-eicosenyl, n-tetracosenyl, n-octacosenyl, triacontenyl, 4-ethyl-3,3-dimethyl-1-noneyl, 5-ethyl-7-n-propyl-14-methyl-1-eicosenyl, and the like.

The cycloalkyl moieties (i.e., R and $R_2$) of the silanes and siloxanes defined by the before-mentioned general structures contain from 4 to 8 carbon atoms in the ring portion of the moiety, and the alkyl portion of the moiety is as defined above. However, it is preferred that the alkyl portion be a lower alkyl containing up to about 8 carbon atoms such as methyl, ethyl, propyl, n-hexyl, n-octyl, and the like. Exemplary of the ring portion of the moiety are cyclobutyl, cyclohexyl, and cyclooctyl. It should be noted that the ring portion of the cycloalkyl moieties defined above can have one or more alkyl substitutes, the only limit being the number of replaceable hydrogen atoms on the carbon atoms forming the ring portion of the particular cycloalkyl moiety.

The cycloalkenyl moieties which are represented by R, and $R_2$ in the before-described general formulas for the silanes and siloxanes which can be employed in the method of the present invention are similar in all respects to the above-described cycloalkyl moieties with the exception that the alkenyl substituent of the moiety contains at least one site of ethylenic unsaturation.

The aryl moieties (i.e., R and $R_2$) of the above-defined silanes and siloxanes which can be employed as the organo silicon compound in the practice of the present invention can be mono-, di-, or tricylic, and the rings may be fused or unfused. Further, the aryl moieties may contain one or more inert substituents thereon, such as the before defined alkyl moieties. Exemplary of the aryl moieties which can be employed as R and $R_2$ in the general structures representing the silanes and siloxanes useful in the practice of the present invention are phenyl, naphthyl, diphenyl, phenyl methyl phenyl, and the like.

The aralkyl moieties represented by R and $R_2$ in the general formulas for the silanes and siloxanes which can be employed as the organo silicon compound in the practice of the present invention include an aryl substituent and at least one alkyl substituent. The aryl substituent can be a mono-, di-, or tricyclic constituent as hereinbefore defined; and the alkyl constituent can any suitable alkyl moiety containing from 1 to 30 carbon atoms as also defined hereinbefore.

Similarly, the aralkenyl moieties represented by R and $R_2$ in the general formulas for the silanes and siloxanes which can be employed as the organo silicon compound in the practice of the present invention include an aryl substituent and at least one alkenyl substituent. The aryl substituent can be, as defined above, a mono-, di-, or tricyclic moiety, and the alkenyl constituent can be any suitable alkenyl moiety containing from 1 to about 30 carbon atoms as also defined hereinbefore.

As previously set forth the silanes which can be employed as the organo silicon compound in the practice of the present invention are represented by the general formula $R-Si-(OR_1)_3$ wherein R is as heretofore defined and $R_1$ is a hydrolyzable moiety selected from the group consisting of an alkyl containing from 1 to about 30 carbon atoms, a hydroxyalkyl, or an alkoxyalkyl. The alkyl substituent of the hydroxyalkyl and the alkoxyalky moieties can also contain from 1 to about 30 carbon atoms. Further, the before mentioned alkyl moiety or the alkyl substituent of the hydroxyalkyl and alkoxyalkyl moieties can have a straight chain or branched chain configuration. Exemplary of such alkyl moieties and alkyl substituents are methyl, ethyl, propyl, butyl, isopropyl, 2-ethylhexyl, n-octyl, n-dodecyl, n-tetradecyl, n-hexadecyl, n-octadecyl, n-eicosyl, n-tricosyl, decacosyl, 4-ethyl-3,3-dimethylheptyl, 7-(1,2-dimethylpentyl)-5-ethyltridecyl, 6-(1-methylbutyl)-8-(2-methylbutyl)tridecyl, 2,3,5-trimethyl-4-propylheptyl, 6-(1- ethylpropyl)-7-(1-pentylhexyl) tetradecyl, and the like. Any silanes as defined by the Generic Structure I and having hydrolyzable moieties can be employed in the practice of the present invention. Preferrably the silane can also be solubilized in a suitable inert, volatile solvent so that the silane can be applied to the concrete in a liquid vehicle so as to assist the migration of the silane from the concrete surface to which it is applied into the concrete structure. However, silanes represented by the general structure

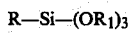

R—Si—(OR$_1$)$_3$ wherein R is an alkyl moiety containing from 1 to about 8 carbon atoms, and R$_1$ is an alkyl moiety having from 1 to about 8 carbon atoms, a hydroxyalkyl moiety having from 1 to about 4 carbon atoms in the alkyl substituent, or an alkoxyalkyl moiety having from 1 to about 4 carbon atoms in the alkyl substituent are believed to be particularly effective in practicing the present invention. Examples of such silanes are ethyltrimethoxysilane, butyltrimethoxysilane, hexyltrimethoxysilane, methyl-tris-(2-methoxy-ethoxy)-silane, ethyl-tris-(2-methoxy-ethoxy)-silane, propyl-tris-(2-methoxy-ethoxy)-silane, butyl-tris-(2-methoxy-ethoxy)-silane, tris-(2-ethoxy-ethoxy)-silane, phenyltriethoxysilane, cresyltriethoxysilane, and the like. It should be noted that while the above silanes are believed particularly effective in the practice of the present invention other silanes can be employed which meet the generic definition of the silanes such as n-dodecysilane, n-tetradecylsilane, n-hexadecylsilane, n-octadecylsilane, n-tricosylsilane, decacosylsilane, branched chain higher molecular weight silanes and the like.

Similarly, any siloxane as defined above by generic structure II and having a hydrolyzable moiety can be employed in the practice of the present invention. Preferably the siloxane can be solubilized in a suitable inert, volatile solvent so that the siloxane can be applied to the concrete in a liquid vehicle so as to assist the migration of the siloxane from the concrete surface to which it is applied into the concrete structure. However, siloxanes represented by the general structure

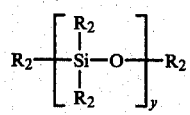

wherein each R$_2$ is the same or different moiety selected from the group consisting of an alkyl containing from 1 to about 8 carbon atoms, an alkenyl containing up to about 8 carbon atoms, an aryl as heretofore defined, or a cycloalkyl, cycloalkenyl, aralkyl or aralkenyl wherein the cyclo substituent contains from about 4 to 8 carbon atoms, the alkyl substituent contains from 1 to about 8 carbon atoms, the alkenyl substituent contains up to about 8 carbon atoms, and y is an integer of from 2 to about 100 are believed to be particularly effective as the organo silicon compound in the practice of the present invention. Exemplary of suitable siloxanes meeting the above definition are hexamethyl disiloxane, hexaphenyl disiloxane, dimethyltetraphenyl disiloxane, tetramethyldiphenyl disiloxane, α,ω-bis-trimethylsiloxypolydimethyl siloxane, α,ω-bis-trimethylsiloxypolydiphenyl siloxane, α,ω-bis-dimethylvinylsiloxypolydimethyl siloxane, α,ω-bis-triethylsiloxypolydiphenyl siloxane, mixtures of such siloxanes and the like. It should be noted that while the above siloxanes are believed particularly effective in the practice of the present invention, other siloxanes meeting the definition of the siloxanes as represented by Generic Structure II can be employed.

The preparation of silanes and siloxanes useful in the practice of the present invention are accomplished by generally known methods and many of such compounds are commercially available. Thus, no discussion of the preparation of such organo silicon compounds is believed necessary to describe the subject invention.

The organo silicon compounds employed in the practice of the present invention, and which are in a liquid state, can be applied directly to the surface of the reinforced concrete structure; or the organo silicon can be dissolved in a suitable liquid vehicle so that upon application of the organo silicon to the surface of a reinforced concrete structure the organo silicon compound is substantially uniformly dispersed over the surface of the structure. Further, the liquid vehicle may assist in the migration of the organo silicon compound into the interior portion of the structure. The liquid vehicle employed with the organo silicon compound can be any suitable volatile organic solvent. Further, the liquid vehicle should be anhydrous and inert to both the reinforced concrete structure and the organo silicon compound (i.e., the liquid vehicle should have no adverse effects on either the reinforced concrete structure or the organo silicon compound).

A variety of different classes of organic solvents can be employed as the liquid vehicle for the organo silicon compounds, such as the silanes and siloxanes heretofore described. Preferably the solvent employed as the liquid vehicle for the organo silicon compounds will have an evaporation rate sufficiently low to permit the organo silicon compound to be spread uniformly over the area being treated, such as a bridge deck or the paved traveling surface of a concrete roadway, while functioning as a vehicle to assist the migration of the organo silicon compound into the interior portion of the structure.

Exemplary of suitable organic solvents which can be employed as the liquid vehicle for the organo silicon compounds in the practice of the present invention are the aromatic or aliphatic organic solvents, including cycloaliphatic hydrocarbon solvents and alcohols, such as toluene, xylene, high boiling naphthas, cyclohexane, tetra-, hydro-, and decahydronaphthalenes, ethanol, propanol, isopropanol, butanol, and the like.

The amount of organic solvent and organo silicon employed to form the solution for treating the reinforced concrete structure can vary widely provided sufficient organo silicon compound is present in the treating solution to substantially cover the surface of the structure being treated, such as the traveling surface of a concrete paved roadway or the concrete deck of a bridge. Generally, an effective amount of the organo silicon compound is present in a treating solution if the treating solution contains from about 0.5 to about 99 weight percent of the organo silicon compound.

The organo silicon compounds as heretofore defined are applied, together with the organic solvent, to a surface of a reinforced concrete structure in accordance with the method of the present invention to inhibit corrosion of the reinforcing steel members of a reinforced concrete structure wherein corrosion of the reinforcing steel member is due primarily to salt migration into the structure. Broadly, the method of the present invention comprises covering a concrete surface of a concrete reinforced structure with an effective amount of the treating solution to substantially coat the concrete surface with the organo silicon compound, allowing the organo silicon compound to penetrate into the reinforced concrete structure for an effective period of time, while also allowing the organic solvent in the treating solution to evaporate, and thereafter applying an effective amount of water to the treated surface of the concrete structure to substantially wet the surface of the structure. The organo silicon containing solution can be applied to the surface of the concrete reinforced structure by any suitable means such as spraying, brushing and the like.

The surface of the concrete reinforced structure to which the organo silicon compound is applied is preferably a clean, dry surface. The term "dry" as used herein is understood to mean a substantially moisture-free surface. The term "clean" as used herein is understood to mean substantially free of excess dirt, hydrocarbon deposits, grease and the like. When the organo silicon compound is to be applied to a structure, such as a concrete paved roadway or concrete bridge deck, which has had considerable use and contains large amounts of dirt, grease and hydrocarbon deposits thereon, the surface is desirably mechanically cleaned by any suitable means, such as sand blasting and the like. If water is used in the cleaning operation of the surface of the structure it is desirable that the surface of the structure be allowed to dry to the substantially dry condition before applying the organo silicon compound to the cleaned surface.

The organo silicon dissolved in a suitable liquid carrier as heretofore defined is, as previously stated, applied to the clean, dry surface of the concrete reinforced structure in an amount effective to substantially cover the surface being treated with the organo silicon. Thereafter, the organo silicon compound is allowed to migrate into the reinforced concrete structure for an effective period of time to insure that the portion of the concrete structure adjacent the surface being coated with the organo silicon becomes impregnated with same. The period of time required to allow the organo silicon to migrate into the reinforced concrete structure can vary widely and will be dependent, to a large degree, upon the viscosity of the solution formed of the organic solvent and the organo silicon, and the porosity of the reinforced concrete structure. However, it is desired that organo silicon be allowed to migrate into the reinforced concrete structure for at least about 30 minutes, more desirably for a period of time from about 1 hour to about 24 hours, before contacting the surface of the organo silicon treated structure with water.

Once the organo silicon has been allowed to migrate into the reinforced concrete structure for a period of time effective to provide the organo silicon impregnated structure, an effective amount of water is applied to the surface of the concrete structure previously treated with the organo silicon to wet such surface. Any suitable means can be employed to apply the water to the treated surface, such as spraying and the like. While the exact mechanism resulting from the application of the water to the surface of the organo silicon impregnated concrete structure is not known, it is believed that the addition of the water enables the hydrolysis of the organo silicon to go to completion and form within the structure a polymeric configuration which retards the migration of salt into the structure, and thus substantially eliminates corrosion of the internal reinforcing steel members of the concrete structure.

In order to more fully describe the present invention the following example is set forth. However, it is to be understood that the example is for illustrative purposes and is not to be construed as limiting the scope of the present invention as defined in the appended claims.

EXAMPLE

A series of tests were conducted where a commercially available organo silicon[a] was applied to a plurality of concrete slabs having no surface abrasion. Each slab had dimensions of 4 feet × 4 feet × 4 inches. The tests were to determine the effect of the organo silicon in preventing salt migration (chloride) into the organo silicon treated slabs. A plurality of concrete slabs were used as control, non-treated slabs, and slabs identical in composition to the control slabs were treated with the organo silicon by brushing the organo silicon over the entire surface of the slabs at a rate of 1 gallon of organo silicon per 32 square feet of concrete. One slab was treated with the organo silicon while the slab was wet with moisture, one slap was air dried prior to application of the organo silicon, and one slab was oven dried prior to the application of the organo silicon. The concrete slabs were allowed to absorb the organo silicon in substantial absence of moisture; and thereafter the slabs were wetted with water. The slabs were then exposed to outdoor, unprotected environmental conditions for several months. The slabs were then salted daily for 150 days with an aqueous salt solution containing 3 percent sodium chloride. The salt treated slabs were cored after the salt treatment to determine the salt migration into the slabs at various depths. Two core samples were pulled from each slab at the depths being investigated to determine the amount of salt (chloride) in the slabs at such depths. The results of the tests are tabulated in Table I.

TABLE I

| Slab | Core | Total Chloride - lbs/yd3 for Indicated Depth | | |
|---|---|---|---|---|
| | | 1/16–½ In. | ½–1 In. | 1–1½ In. |
| Control | | 10.8 (Average) | 7.8 (Average) | 4.4 (Average) |
| Treated Sample (b) | 1 | 0.32 | 0.15 | 0.25 |
| | 2 | 0.13 | 0.04 | 0.14 |
| Treated Sample (c) | 1 | 0.26 | 0.18 | 0.34 |
| | 2 | 0.83 | 0.22 | 0.32 |
| Treated Sample (d) | 1 | 1.36 | 0.10 | 0.14 |
| | 2 | 0.44 | 0.0 | 0.19 |

(a) Chem-trete ® Silane—an organo silicon marketed by Dynamit Nobel of America, Inc. containing 40 weight percent of an alkyl-alkoxysilane dissolved in ethyl alcohol.
(b) Slabs were fog-room cured for 35 days and Chem-trete ® Silane was applied to the wet slab.
(c) Slabs were fog-room cured for 28 days, then dried in laboratory air for 7 days and Chem-trete ® Silane was then applied.
(d) Slabs were fog-room cured for 28 days, then oven-dried for 8–10 hours at 300° F. Chem-trete ® Silane was applied after cooling.

The above data initially indicated that the moisture content of the concrete at the time of treatment with the organo silicon had no apparent effect on performance. However, for a product to be acceptable the product must be capable of withstanding a large number of salt applications while still inhibiting salt migration into the concrete. In order to determine the long range effectiveness of an organo silicon in preventing salt migration into concrete, the tests were continued and daily salt applications as set forth above applied to the slabs for 386 days. The results of the extended testing are tabulated in Table II.

TABLE II

| Slab | Core | Total Chloride - lbs/yd3 for Indicated Depth | | | |
|---|---|---|---|---|---|
| | | 1/16-½ In. | ½-1 In. | 1-1½ In. | 1½-2 In. |
| Control | | 13.55 | 10.91 | 9.34 | 6.03 |
| Treated Sample (b) | 1 | 4.03 | 1.42 | 0.61 | 0.52 |
| | 2 | 5.88 | 3.32 | 0.95 | 0.76 |
| Treated Sample (c) | 1 | 5.11 | 2.96 | 0.78 | 0.59 |
| | 2 | 1.28 | 0.66 | 0.62 | 0.52 |
| Treated Sample (d) | 1 | 0.66 | 0.47 | 0.40 | 0.34 |
| | 2 | 0.80 | 0.49 | 0.37 | 0.29 |

(a) Chem-trete® Silane—an organo silicon marketed by Dynamit Nobel of America, Inc. containing 40 weight percent of an alkyl-alkoxysilane dissolved in ethyl alcohol.
(b) Slabs were fog-room cured for 35 days and Chem-trete® Silane was applied to the wet slab.
(c) Slabs were fog-room cured for 28 days, then dried in laboratory air for 7 days and Chem-trete® Silane was then applied.
(d) Slabs were fog-room cured for 28 days, then oven dried for 8-10 hours at 300° F. Chem-trete® Silane was applied after cooling.

The data set forth in Table II clearly indicates the improved protection afforded a concrete slab against salt intrusion when dry concrete is treated with an organo silicon, and after migration of the organo silicon into the concrete, the organo silicon impregnated concrete is subsequently wetted with water.

While the subject invention has been described in terms of certain preferred embodiments, such are intended for illustrative purposes only and alternatives or equivalents may readily occur to those skilled in the art without departing from the spirit or scope of the invention as set forth in the appended claims.

What is claimed is:

1. A method for inhibiting corrosion of internal reinforcing members of a reinforced concrete structure due to salt migration into the structure via a surface thereof comprising:
   providing at least one substantially dry surface of the structure;
   contacting at least one substantially dry surface of the structure with an effective amount of an organo silane compound to substantially coat the surface of the structure, the silane having the general formula:
   $R-Si-(OR_1)_3$, wherein:
   R is an alkyl group containing from 1 to about 30 carbon atoms, an alkenyl group, an aryl group, a cycloalkyl group, a cycloalkenyl group, an aralkyl group, or an aralkenyl group; and
   $R_1$ is an alkyl group containing from 1 to about 8 carbon atoms, a hydroxyalkyl group, or an alkoxyalkyl group;
   permitting organo silane compound to migrate into the reinforced concrete structure; and
   reacting the organo silane in the reinforced concrete structure with an effective amount of water to hydrolyze the organo silane in the structure and form a salt resisting barrier internally within the structure.

2. A method for inhibiting corrosion of reinforcing members in a paved concrete driving structure having a driving surface due to salt migration into the structure comprising:
   providing a substantially dry driving surface of the structure;
   contacting the substantially dry driving surface with an effective amount of an organo silane compound to provide an organo silane covered driving surface, the silane having the general formula:
   $R-Si-(OR_1)_3$, wherein:
   R is an alkyl group containing from 1 to about 30 carbon atoms, an alkenyl group, an aryl group, a cycloalkyl group, a cycloalkenyl group, an aralkyl group, or an aralkenyl group; and
   $R_1$ is an alkyl group containing from 1 to about 8 carbon atoms, a hydroxyalkyl group, or an alkoxyalkyl group; and
   permitting organo silane compound to migrate into the structure; and
   reacting the organo silane in the structure with an effective amount of water to hydrolyze the organo silane in the structure and form a salt resisting barrier internally within the structure.

3. A method for inhibiting corrosion of steel reinforcing members of a concrete bridge deck having a paved concrete driving surface comprising:
   providing a substantially dry driving surface of the bridge deck;
   contacting the substantially dry driving surface of the bridge deck with an effective amount of an organo silane compound to substantially cover the concrete driving surface with the organo silane compound, the silane having the general formula:
   $R-Si-(OR_1)_3$, wherein:
   R is an alkyl group containing from 1 to about 30 carbon atoms, an alkenyl group, an aryl group, a cycloalkyl group, a cycloalkenyl group, an aralkyl group, or an aralkenyl group;
   $R_1$ is an alkyl group containing from 1 to about 8 carbon atoms, a hydroxyalkyl group, or an alkoxyalkyl group;
   permitting organo silane compound to migrate into the bridge deck to form an organo silane impregnated bridge deck; and
   reacting the organo silane in the bridge deck with an effective amount of water to hydrolyze the organo silane compound in the bridge deck and form a salt resisting barrier internally within concrete bridge deck.

4. The method of claims 1, 2 or 3 in which the organo silane compound is dissolved in an effective amount of solvent.

5. The method of claims 1, 2, or 3 in which R is an alkyl containing from 1 to about 8 carbon atoms, an alkenyl group, an aryl group, a cycloalkyl group, an aralkyl group or an aralkenyl group.

6. The method of claim 5 in which the organo silane compound is dissolved in an effective amount of solvent.

7. The method of claim 5 in which R is isobutyl and in which $R_1$ is methyl.

8. The method of claim 7 in which the organo silane compound is dissolved in an effective amount of solvent.

* * * * *